No. 765,320. PATENTED JULY 19, 1904.
W. B. PAGE & A. E. HOPKINS.
WRAPPING MACHINE.
APPLICATION FILED APR. 23, 1897.
NO MODEL. 11 SHEETS—SHEET 1.

Witnesses:
Frank S. Blanchard

Inventors:
William B. Page
Archibald E. Hopkins
By Walter H. Chamberlin
Attorney.

No. 765,320. PATENTED JULY 19, 1904.
W. B. PAGE & A. E. HOPKINS.
WRAPPING MACHINE.
APPLICATION FILED APR. 23, 1897.
NO MODEL. 11 SHEETS—SHEET 7.

Witnesses:
Frank S. Blanchard
DeWitt N. Chamberlin

Inventors:
William B. Page
Archibald E. Hopkins
By Walton H. Chamberlin
Attorney.

No. 765,320.

Patented July 19, 1904.

UNITED STATES PATENT OFFICE.

WILLIAM B. PAGE AND ARCHIBALD E. HOPKINS, OF DIXON, ILLINOIS, ASSIGNORS, BY MESNE ASSIGNMENTS, TO BORDEN'S CONDENSED MILK COMPANY, A CORPORATION OF NEW JERSEY.

WRAPPING-MACHINE.

SPECIFICATION forming part of Letters Patent No. 765,320, dated July 19, 1904.

Application filed April 23, 1897. Serial No. 633,514. (No model.)

*To all whom it may concern:*

Be it known that we, WILLIAM B. PAGE and ARCHIBALD E. HOPKINS, citizens of the United States, residing at Dixon, county of Lee, State of Illinois, have invented a certain new and useful Improvement in Wrapping-Machines; and I declare the following to be a full, clear, and exact description of the invention, such as will enable others skilled in the art to which it pertains to make and use the same, reference being had to the accompanying drawings, which form a part of this specification.

Our invention has for its object the production of a machine for wrapping articles with paper or similar substance. The several mechanisms combined in such machine will be hereinafter more particularly described and claimed.

It will be observed that the wrapping mechanisms illustrated in the drawings and hereinafter described are in this instance combined with caramel cutting and feeding mechanisms; but it will be understood that the latter are illustrated and described in the present case only for the purpose of disclosing the best mode of utilizing our invention in wrapping mechanisms hereinafter more specifically claimed.

In carrying out the invention we will first describe the general construction of the machine and later the specific mechanisms.

Figure 5:
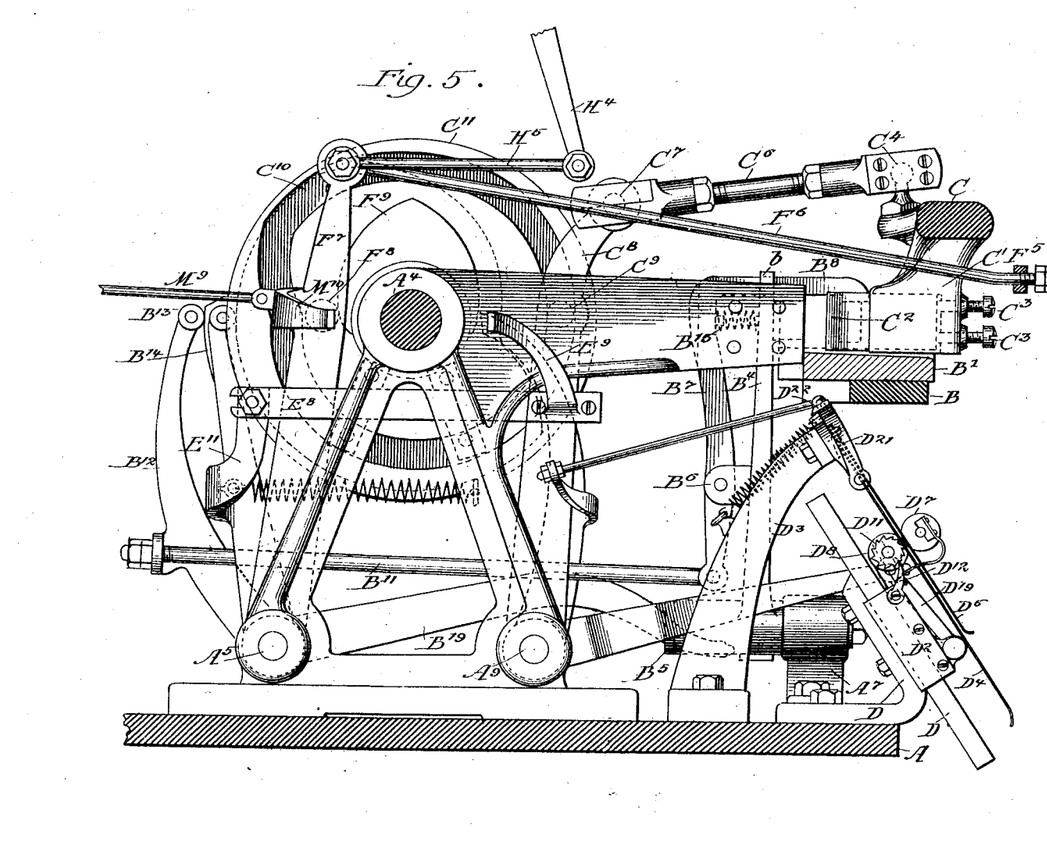
Fig. 5 is a sectional view on the line 5 5, Fig. 6.
Figure 6:
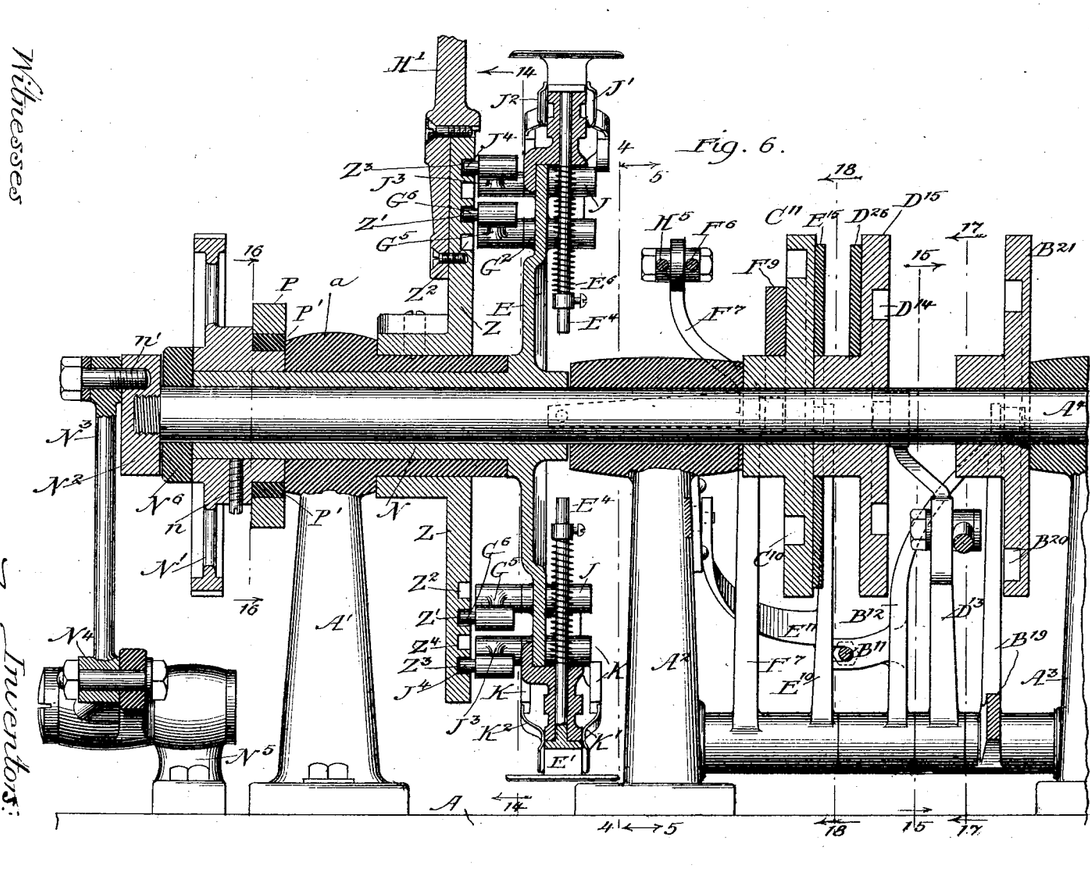
Fig. 6 is a sectional view on the line 6 6, Fig. 1.

A is a table from which are supported the standards $A'$ $A^2$ $A^3$, Fig. 6. On the upper ends of these standards are bearings which support the main shaft $A^4$ of the machine. On the end of this shaft is a suitable drive-pulley $A^{10}$, Fig. 1. By reference to Fig. 6 it will be observed that there are several disks located on the shaft $A^4$. These are what may be termed "cam-disks" and, as hereinafter explained, are either provided with cam-grooves on their faces or cam-disks on their peripheries and are for the purpose of operating the various mechanisms hereinafter described. Extending from the standard $A^2$ to the standard $A^3$, Fig. 6, is a rod $A^5$, Fig. 5, on which are pivoted various levers that are operated by the cams just mentioned. Mounted also on the shaft $A^4$, Fig. 6, is a wheel or disk E, having a series of pockets, in which the article to be wrapped (which is in this case a caramel and which we will hereinafter refer to as a "caramel") is carried during the wrapping operation. Carried by the bearing $a$ on the standard $A'$ is a plate Z, having in its face a series of cam-grooves (shown particularly in Fig. 14) adapted to operate the various mechanisms carried by the wheel E as the wheel revolves. It will be understood that the shaft $A^4$ and the cam-plates, except the cam-plate Z, are continually revolving, while the wheel E is given an intermittent motion by mechanism hereinafter described.

We will now proceed to describe the various mechanisms in detail.

Figure 1:
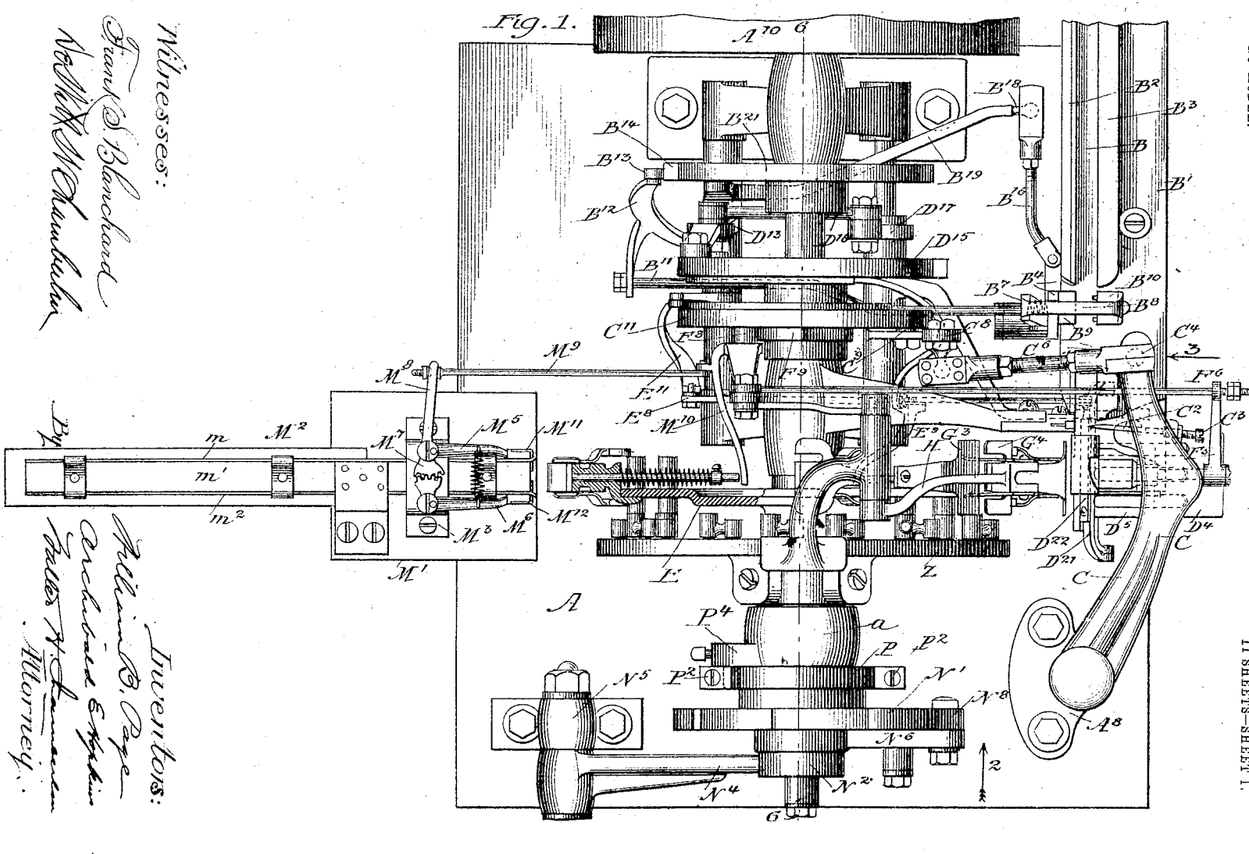
Figure 1 is a plan view of our machine.
Figure 4:
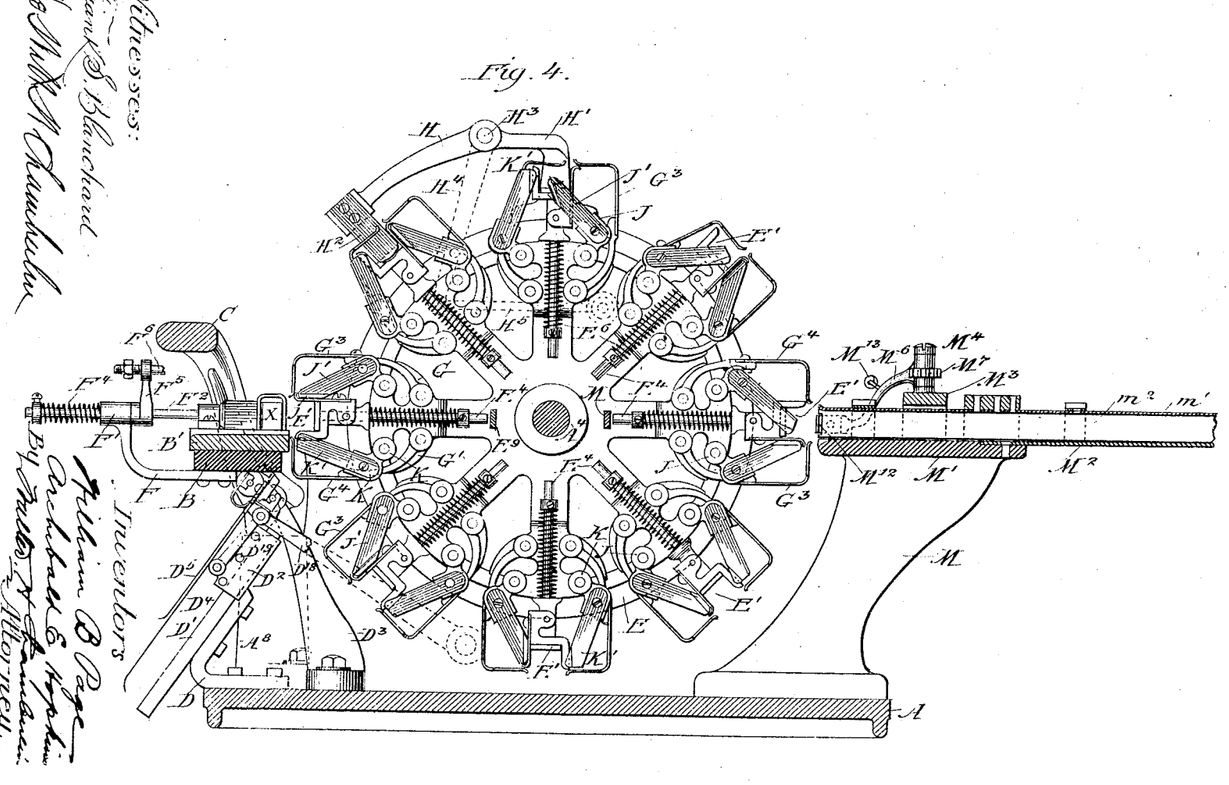
Fig. 4 is a sectional view on the line 4 4 of Fig. 6.
Figures 15, 16:
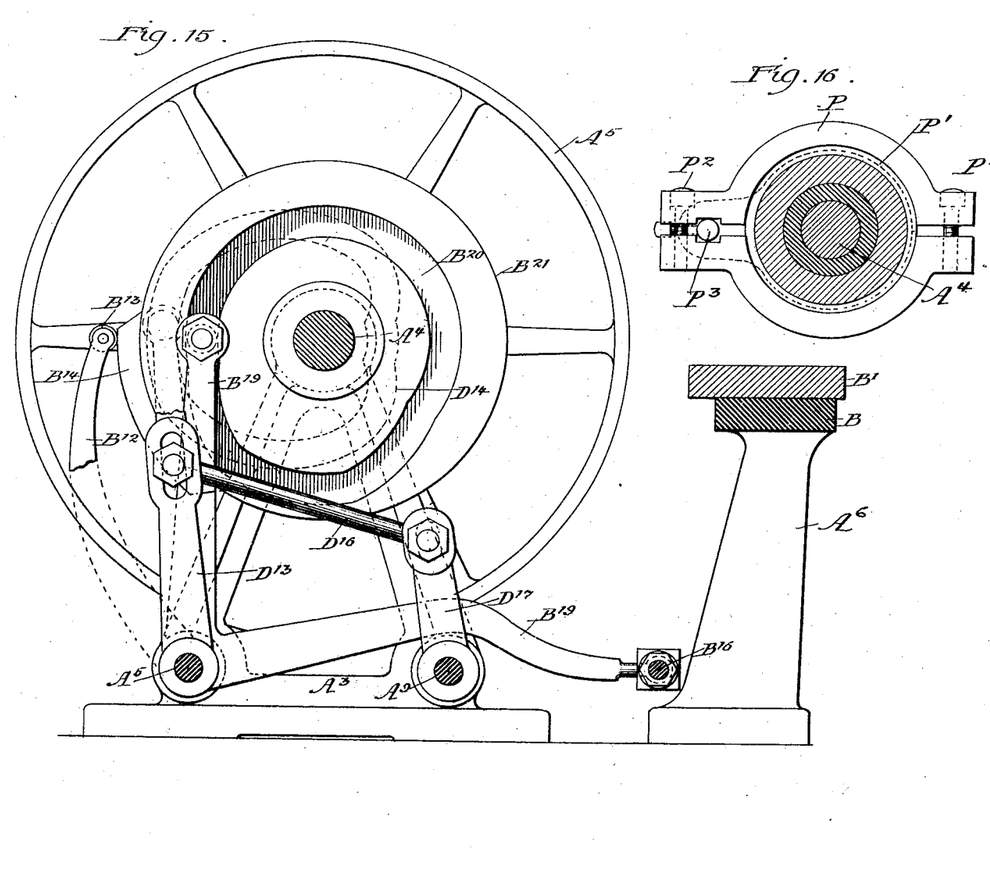
Fig. 15 is a sectional view on the line 15 15, Fig. 6.
Fig. 16 is a sectional view on the line 16 16, Fig. 6.

*The candy-feed mechanism.*—Supported from the table A by suitable standards $A^6$ is a table B, Figs. 4 and 15, and above this table is another table B', having thereon two strips $B^2$ $B^3$, Fig. 1, which constitute a way for the strip of candy or other material.

Figure 2:
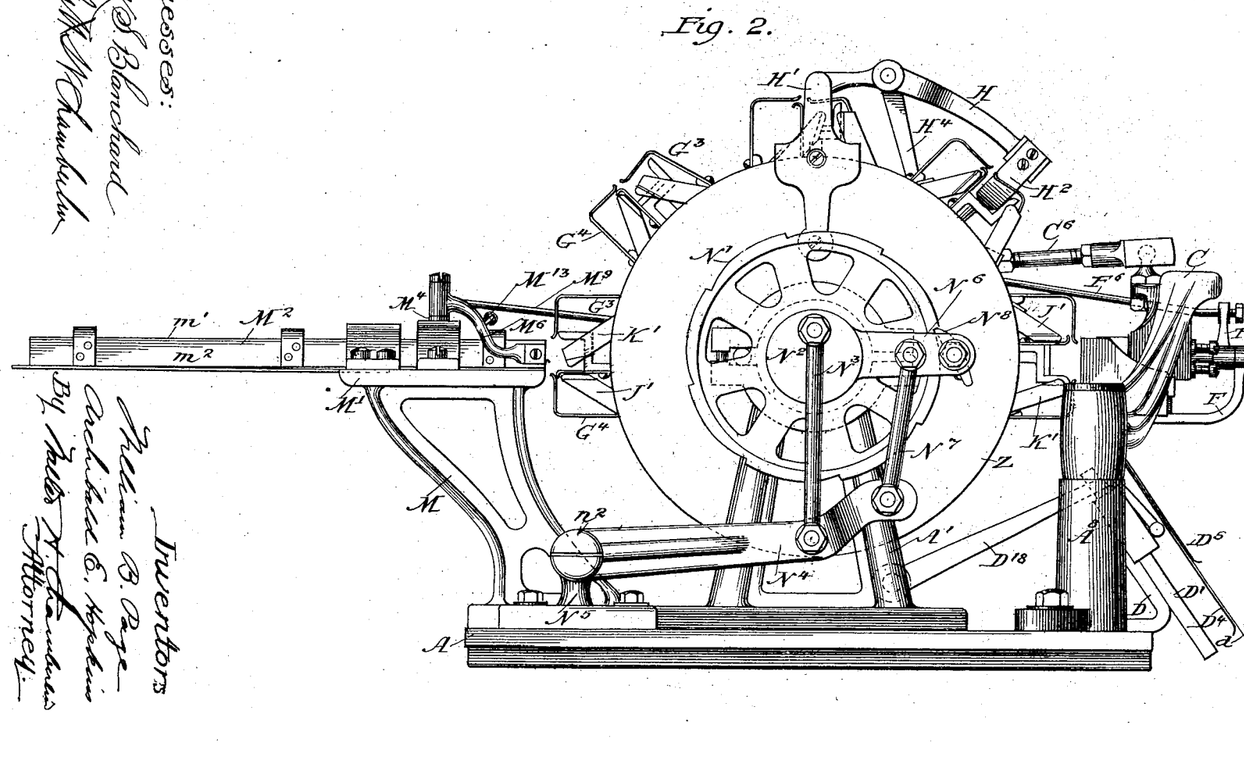
Fig. 2 is an end elevation looking in the direction of arrow 2, Fig. 1, three of the hereinafter-described and similarly constructed and operating wheel-pockets being omitted as unnecessary in this instance for an understanding of the machine and to permit clearness in the definition of outlines of intervening details.
Figure 3:
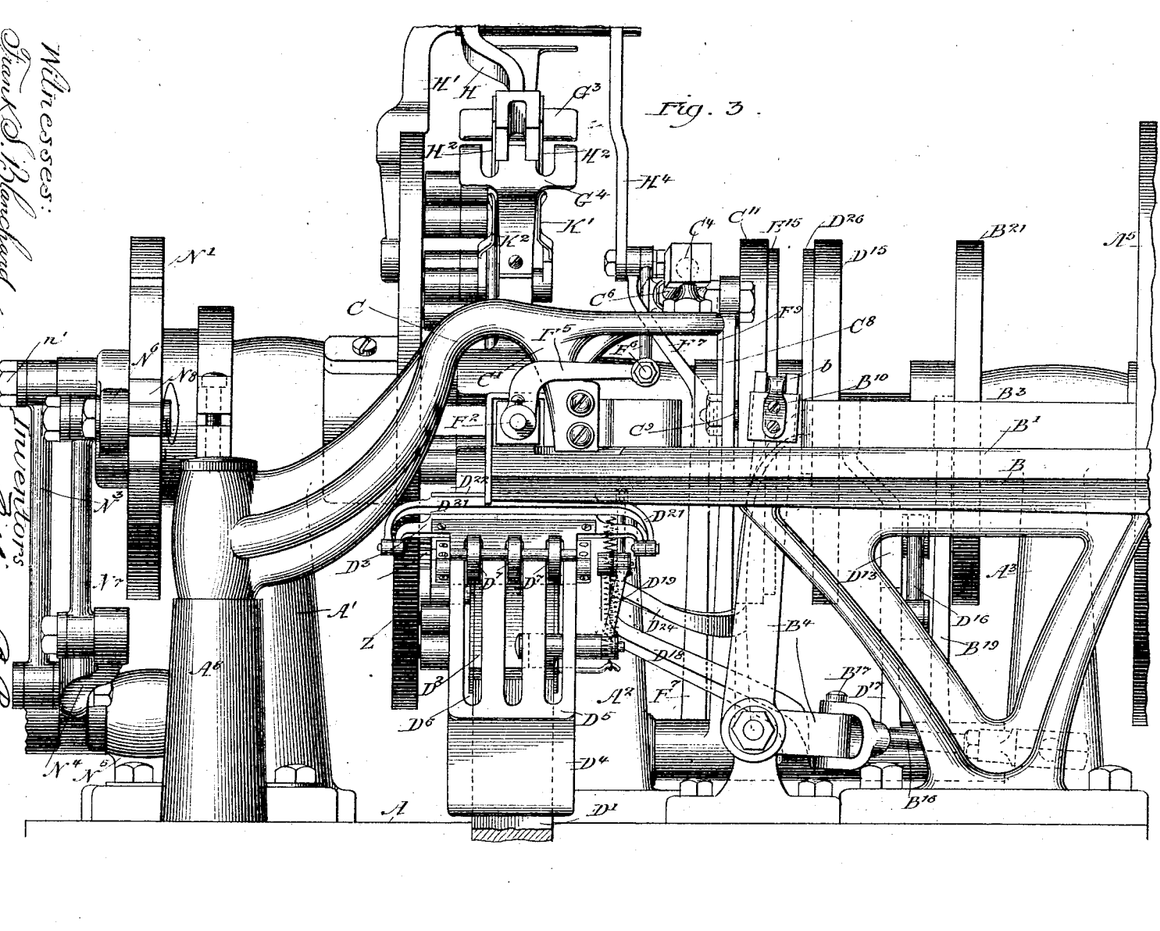
Fig. 3 is an elevation looking in the direction of arrow 3, Fig. 1.

$B^4$ is a lever, Figs. 1, 3, and 5, of bell-crank form pivoted on a stud $B^5$, Fig. 5, the latter being supported by standards $A^7$, extending from the table A. Pivoted to the projection $B^6$, extending from the lever $B^4$, is another lever $B^7$, having on the upper end an arm $B^8$, which extends through the forked end $b$, Fig. 3, of the lever $B^4$. On the lever $B^4$, below the arm $B^8$, is a block $B^9$, and on the end of the arm $B^8$ is another block $B^{10}$, Figs. 1 and 3, the two blocks forming clamping-jaws and each provided with small projecting pins to make the clamp positive. These blocks are preferably made of wood as the best material with which to handle the candy. Pivoted to the end of the lever $B^7$ is a rod $B^{11}$, Fig. 5, said rod being rotatably engaged to the lever $B^{12}$. This lever $B^{12}$ is pivoted on the rod $A^5$, Figs. 5 and 6, and its upper end is provided with a roller $B^{13}$, which bears upon the cam $B^{14}$, Figs. 1 and 15. Thus when the lever $B^{12}$ is oscillated by the cam it operates through the rod $B^{11}$ to tilt the lever $B^7$ and throw the block $B^{10}$ away from the block $B^9$. As soon as the roller $B^{13}$ slides off from the cam $B^{14}$ the spring $B^{15}$ (shown by dotted lines, Fig. 5) returns the parts to their normal position, with the strip of candy clamped between the blocks $B^9$ $B^{10}$. Pivoted to the short arm of the lever $B^4$, Fig. 3, is an arm $B^{16}$, the pivot $B^{17}$ being to provide for horizontal oscillation of the arm $B^{16}$ independent of the lever $B^4$; but the pivot being vertical any vertical oscillation of the arm $B^{16}$ will oscillate the lever $B^4$. Connected with the arm $B^{16}$ by a ball-joint $B^{18}$ is one end of a lever $B^{19}$, Fig. 15. This lever is of bell-crank form and is pivoted on the rod $A^5$. The other arm of this lever is provided with a roller which travels in the cam-groove $B^{20}$ in the cam-disk $B^{21}$. Thus an oscillation of the lever $B^{19}$ by the cam-groove $B^{20}$ oscillates the arm $B^{16}$, and consequently the lever $B^4$ and simultaneously the lever $B^7$. Thus the strip of candy having been grasped, as before explained, between the blocks $B^9$ $B^{10}$ the cam-groove $B^{20}$ comes into play, oscillates the lever $B^4$, and consequently reciprocates the clamping-blocks $B^9$ $B^{10}$. The strip of candy is thus carried along to the point where it is cut. This may be accomplished in any convenient manner—as, for instance, by the following devices. C is an arm pivoted to the upright or standard $A^8$, extending from the main bed, Fig. 2. On the under side of this arm is a downward projection C', Figs. 3 and 5, and in this projection C' is the knife proper, $C^2$. The knife is held to the arm C' by any preferred means. Carried by the main frame is a suitable cutting-block, against which the knife cuts. This may be of any of the well-known forms used for that purpose. By the oscillation of the arm C this knife is given a reciprocating motion across the way into which the strip of candy is forced by the feeding mechanism above described and the desired length of caramel is thus cut off. The arm C is oscillated as follows: Engaged to the end of the arm C by the ball-joint $C^4$, Fig. 5, is a rod $C^6$, the opposite end of this rod $C^6$ being engaged by a ball-joint $C^7$ to the upper end of the lever $C^8$. This lever $C^8$ is pivoted to the rod $A^9$, Fig. 5, and is provided with a roller $C^9$, (shown by dotted lines, Fig. 5, full lines, Fig. 3,) which travels in the cam-groove $C^{10}$ in the face of the cam-disk $C^{11}$. Thus the oscillation of the lever $C^8$ through the rod $C^6$ oscillates the arm C and causes the knife to cut the candy by being drawn as distinguished from being pushed through the latter. This leaves a piece of candy or a caramel the desired size at such a point that the feeding of the next caramel will force the one first cut to the desired point to commence the wrapping operation. Simultaneously with this feeding and cutting of the caramel, as above described, a strip of paper is fed to the desired point and cut by mechanism which we will now describe.

Figures 18, 19:
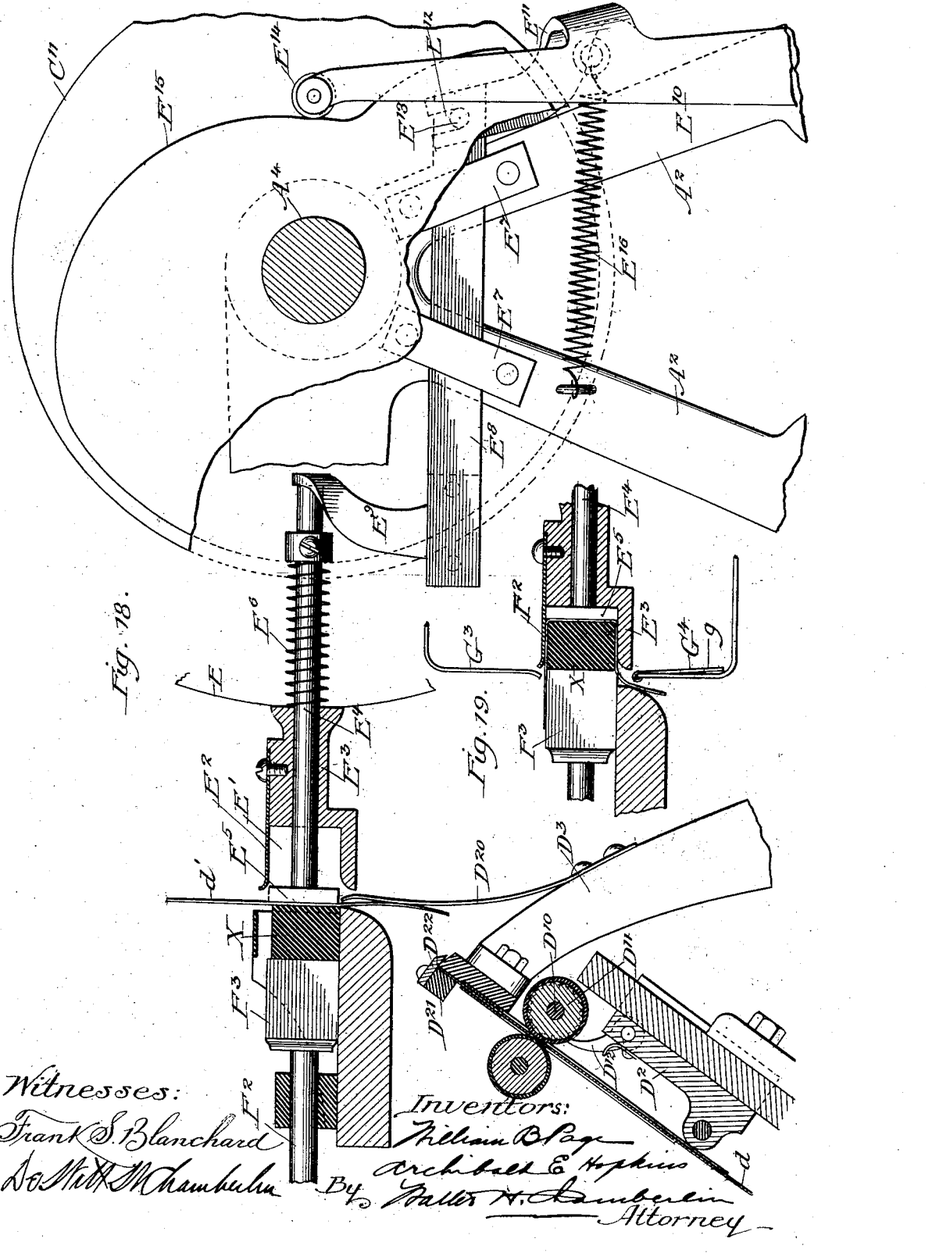
Fig. 18 is a sectional view on the line 18 18, Fig. 6, illustrating also the plunger for forcing the caramel into the wheel-pocket and also the mechanism for feeding the paper.
Fig. 19 is a detail illustrating the caramel after it has been placed in the pocket.
Figure 20:
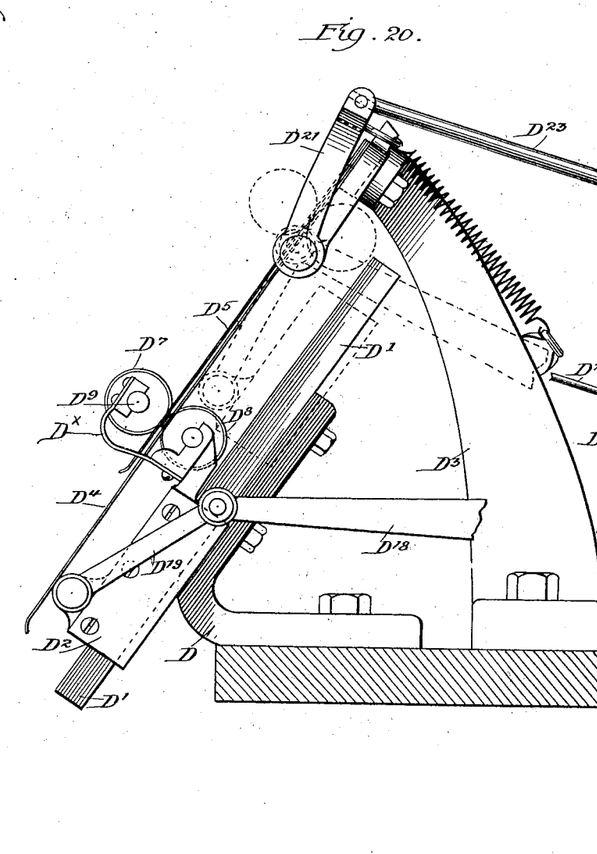
Fig. 20 is a detail, on a larger scale, of the mechanism adjoining that shown in Fig. 17 and adapted to feed the strip of paper.

*Paper feeding and cutting mechanism.*— Engaged to the bed-plate A, Figs. 4 and 20, is a bracket D, bent as shown, and to one arm of this bracket is engaged the paper-feeding mechanism. Engaged to the bracket and held on an incline, as shown, is a way or track D', and reciprocating thereon is what we will term a "carriage" $D^2$. Supported also from the bed A, Figs. 18 and 20, is an arm $D^3$, the end terminating above the way D'. Engaged to the upper end of the arm $D^3$ are two plates $D^4$ $D^5$, Fig. 20, made of thin metal and extending downward above the way D'. These plates are slotted, as at $D^6$, Fig. 3. Carried by the carriage $D^2$ are two sets of rollers $D^7$ $D^8$, Fig. 20, the set $D^7$ held in close contact with the other by a spring $D^\times$, there being in the present machine three rollers in each set, as shown in Fig. 3. The rollers $D^7$ are free to turn in either direction with their shaft $D^9$. On the shaft $D^{10}$, Figs. 5 and 18, is a ratchet-wheel $D^{11}$ and on the carriage $D^2$ is a spring-impelled pawl $D^{12}$. The result is that the rollers $D^8$ are free to turn when the carriage is moving downward, but are prevented from turning when the carriage moves upward by the pawl $D^{12}$.

Figure 17:
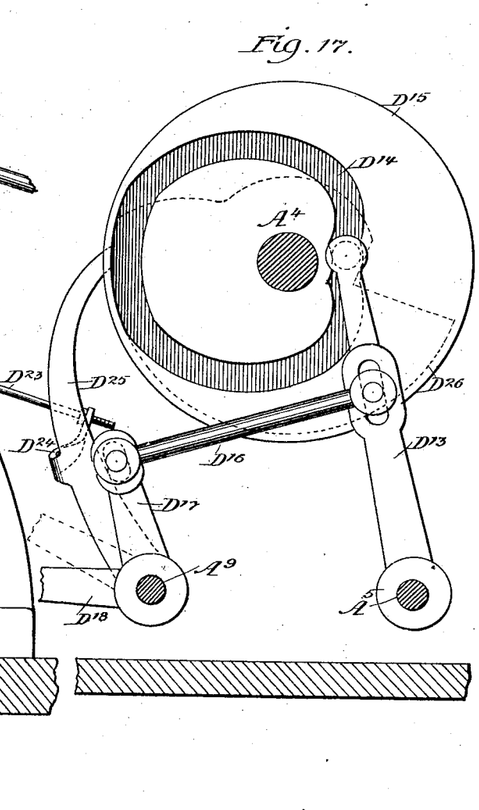
Fig. 17 is a sectional view on the line 17 17, Fig. 6.

The carriage $D^2$ is reciprocated by the following mechanism: On the rod $A^5$, Fig. 17, is a lever $D^{13}$, provided on its upper end with a roller which travels in the cam-groove $D^{14}$ in the face of the disk $D^{15}$. Pivoted to this lever $D^{13}$ is a rod $D^{16}$, the engagement being a slotted one to provide for adjustment. The other end of this rod $D^{16}$ is pivoted to one arm, $D^{17}$, of a bell-crank lever, which is in turn pivoted to the rod $A^9$. The other arm, $D^{18}$, of this bell-crank lever is connected by the pitman D¹⁹ with the carriage D². It will thus be seen that a revolution of the cam-disk D¹⁵ will through the mechanism just described reciprocate the carriage D² on the way D'. Now by inserting a strip of paper between the plates D⁴ D⁵ and passing it up between the rollers D⁷ D⁸ when the carriage D² is moved upward, the rollers D⁸ being held from revolution by the pawl D¹², the paper will be grasped between the two sets of rollers (the rollers projecting through the slots D⁶) and will be carried up by the rollers. This strip of paper is indicated at $d$, Fig. 18. Engaged to the arm D³ is a strip of thin metal D²⁰, the upper end terminating adjacent to the caramel to be wrapped, so that as the paper is fed upward it is guided to the proper point by said strip D²⁰. On the upper end of the arm D³, Figs. 3, 18, and 20, is a pivoted frame or bar D²¹, carrying a knife D²². When the carriage reaches the upper end of its stroke, the knife through mechanism which we will presently describe descends and cuts the paper, leaving a strip $d'$ in the relative position shown in Fig. 18, while the bar D²¹ clamps the upper end of the strip and holds it while the feeding-carriage descends. The mechanism for operating the paper-knife to cut it is as follows: A rod D²³, Fig. 20, is pivoted to the frame D²¹ and extends to the arm D²⁴ on the lever D²⁵, Fig. 17. This lever D²⁵ is pivoted on the rod A⁹. The upper end of this lever D²⁵ rests against the cam D²⁶, (shown by dotted lines, Fig. 17, and shown in full lines, Figs. 3 and 6.) This cam is engaged to and partakes of the motion of the disk D¹⁵. Thus a revolution of the latter operates the paper-knife D²². It will now be seen by reference to Fig. 18 that we have cut off the caramel, which we will designate X, and located in front of it a strip of paper $d'$.

Located on the main shaft A⁴ and intermittently revolved by mechanism which we will presently describe is what we will term a "wheel" E, Figs. 4 and 6. Carried by this wheel is a series of pockets or receptacles E'. By reference to Fig. 19 it will be seen that one side of each pocket is made up of a yielding strip E², so that when the caramel X is pressed into it there will be sufficient friction to hold the caramel firmly in the pocket.

Supported from the table B is an arm F, Fig. 4, having in its upper end a bearing F', in which reciprocates a plunger-rod F². On the end of this plunger-rod F² is a plunger-block F³. The plunger F² is normally held in its retracted position, as shown in Fig. 18, by the spring F⁴, Fig. 4. Carried by the fitting E³, which forms the pocket E', is a plunger-rod E⁴, Fig. 18, having on its end a plunger-block E⁵, held normally in the position shown in Fig. 19 by the spring E⁶. When the caramel X and strip of paper $d'$ have reached the position shown in Fig. 18, mechanism which we will presently describe has forced the plunger E⁵ out to the position shown in Fig. 18, and the caramel X and strip $d'$ have been clamped between the plungers E⁵ F³. The plunger F³ is now advanced and the plunger E⁵ retracted, and the caramel with the paper on three sides is forced into the pocket, as shown in Fig. 19.

The mechanism for operating the plunger E⁵ is as follows: Suitably sustained in ways E⁷, Fig. 18, on the standard A² is a strip E⁸, carrying on its end an arm E⁹, and the end of this arm E⁹ is located back of the end of the plunger-rod E⁴. Pivoted on the shaft A⁵ is a lever E¹⁰, having an arm E¹¹, Fig. 18, the end of which is slotted, as at E¹², and embraces a pin E¹³ (shown in dotted lines, Fig. 18) on the end of the strip E⁸. The upper end of the lever E¹⁰ is provided with a roller E¹⁴, which bears upon a cam E¹⁵, Figs. 3 and 18, attached to the cam-disk C¹¹. A spring E¹⁶ tends to keep the roller constantly against the cam. By properly timing the revolution of the cam E¹⁵, the arm E⁹ bearing on the end of the plunger-rod E⁴, (pressure being exerted by the spring E¹⁶,) the plunger will be forced outward and clamp the caramel and paper, as above described, and a continued revolution of the cam will retract the parts and the spring E⁶ will draw the plunger E⁵ back into the pocket E'.

The plunger F³ is operated as follows: On the plunger-rod F², Figs. 1, 3, and 4, is an arm F⁵. Engaged to the end thereof is a rod F⁶. This rod F⁶ extends to and is pivoted to the lever F⁷, Figs. 1, 5, and 6. The lever F⁷ is pivoted to the rod A⁵ and is provided on its face with a roller F⁸, which bears on the cam F⁹, Figs. 1, 5, and 6, the latter being attached to the disk C¹¹.

Figure 7:
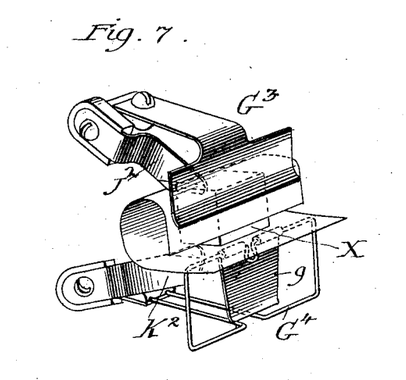
Figs. 7, 8, 9, 10, 11, 12, and 13 are detail views illustrating the various steps in the folding operation.
Figure 8:
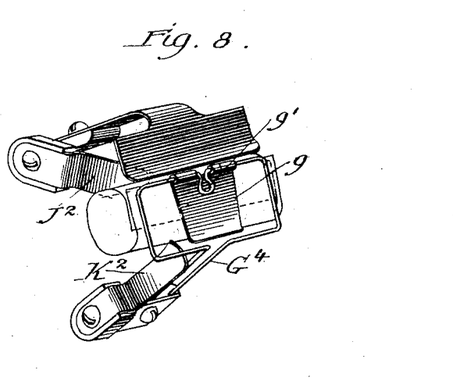

It will thus be seen that by the above mechanism the caramel X has been forced into the pocket of the wheel E with the paper against three of its six sides. The wheel is now moved one step in its revolution and during this movement or step the paper is given two folds, as shown in Figs. 7 and 8, by mechanism which we will now describe.

*Side-lap mechanism.*—G G', Fig. 4, are arms pivoted in suitable bearings G² on the main wheel E. These arms are provided on their outer ends with strips G³ G⁴. (Shown in detail in Figs. 7 and 8.) The strip G⁴ is of somewhat larger dimensions than the strip G³ and made of wire to properly hold the paper when it is being folded. The axle or shaft of each arm G G' is provided with a crank-arm G⁵, Figs. 6 and 14, and the end of this arm is provided with a projecting pin G⁶, which in the case of the arms G G enters a cam-groove Z' and in the case of the arms G' a cam-groove Z² in a stationary cam-plate Z, Figs. 6 and 14. It will thus be seen that as the wheel E revolves the cam-grooves in the plate Z will tilt the arms G G'. The cam-grooves are so arranged that as the wheel E moves its first step after receiving the caramel the arm G will be tilted down, thus throwing the strip $G^3$ against the projecting edge of the paper and folding down, as shown in Fig. 7, and as the wheel continues to move this strip $G^3$ will be withdrawn and the wire strip $G^4$ will be thrown up, folding the other edge up against the first edge, the arm $G'$ being operated by the cam-groove $Z^2$, Fig. 14. The wire $G^4$ carries a strip $g$, Fig. 8, which serves to bear against the paper and hold it in place. As soon as the fold (shown in Fig. 8) is complete the wheel ceases its first-step motion and the caramel is ready for the end-tuck mechanism. (Shown in Fig. 9.)

Figures 9, 10, 11, 12, 13:
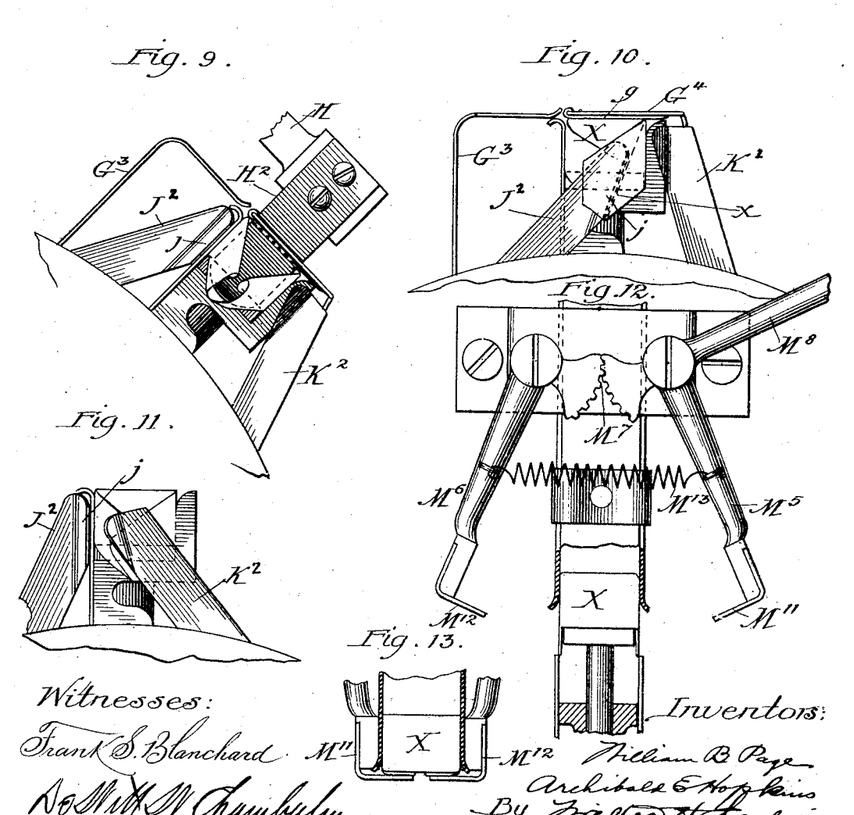

*End-tuck mechanism.*—This is accomplished by means of a lever H, pivoted to an arm $H'$, which extends up from the stationary cam-plate Z. On the end of this lever H, Figs. 4 and 9, are two strips $H^2$, (one for each end of the caramel,) which project downward. Obviously, as shown in Fig. 4, when the wheel E stops if the arm H is depressed the strips $H^2$, bearing against the folded edges of the paper at each end of the caramel, will tuck the paper down, as shown in Fig. 9. The arm H is oscillated by the following mechanism: On the axle $H^3$ of the arm is a depending arm $H^4$, (shown by dotted lines, Fig. 4, and by full lines, Fig. 5,) the lower end of this arm $H^4$ being connected with the lever $F^7$ by the rod $H^5$. Thus a movement of the lever $F^7$, as before explained, tilts or oscillates the lever H and tucks the paper at the ends of the caramel. The wheel E is now given another step in its revolution, and during the course of this step movement the first end fold is made by mechanism which we will now describe.

*First end-fold mechanism.*—Pivoted to the wheel E is a fitting J, provided on each side of the pocket $E'$ with projecting strips $J'$ $J^2$, Figs. 4, 6, and 10. Each of these strips $J'$ $J^2$ has its corner $j$ beveled, so that when tilted it will engage the fold of the paper at each end of the caramel, as shown in Fig. 10, and press or fold it over. The strips are turned out slightly, so that they will slide more easily without tearing the paper. The fitting J has its axle or pivot provided with a crank-arm $J^3$, and on the end thereof is a projecting pin $J^4$, that travels in a cam-groove $Z^3$ in the stationary cam-plate Z, Figs. 6 and 14. Thus as the wheel revolves after leaving the end-tucking arm H the cam-groove $Z^3$ in the plate Z tilts the strips $J'$ $J^2$ and makes one fold of the end.

Figure 14:
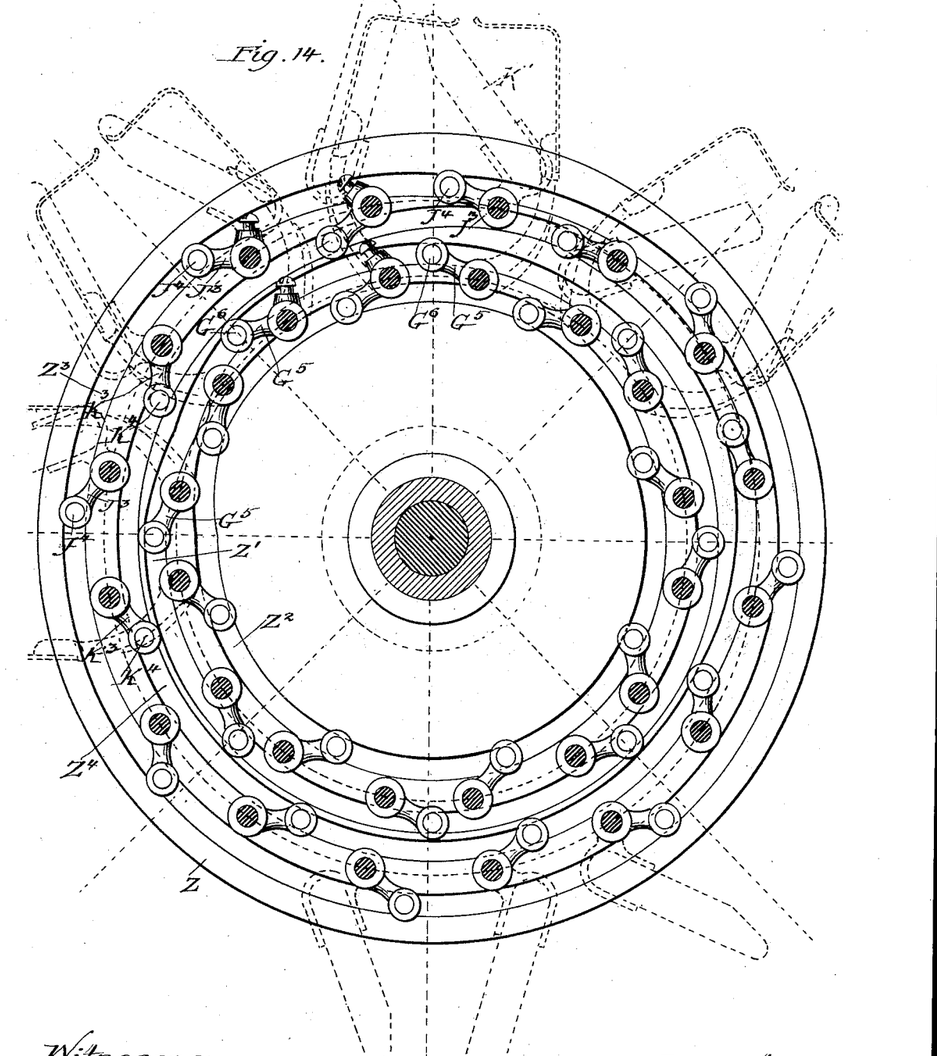
Fig. 14 is a sectional view on the line 14 14, Fig. 6.

*Second end-fold mechanism.*—On the opposite side of the pocket $E'$ is another fitting, K, pivoted also in the wheel E and provided with folding-strips $K'$ $K^2$, operated by a crank-arm $K^3$, having a pin $K^4$, that travels in the cam-groove $Z^4$, Fig. 14. As the wheel makes another step in its revolution the cam-groove $Z^3$ will tilt back the strips $J'$ $J^2$, and the cam-groove $Z^4$ will tilt down the strips $K'$ $K^2$ and make the second end fold. This last fold is illustrated in Fig. 11. We desire at this point to call attention to the peculiar form of fold made by these end-folding fingers. It will be observed that the fingers $J'$ $J^2$ and $K'$ $K^2$ are long enough in proportion to the caramel to be wrapped, so that the ends of the fingers $J'$ $J^2$ $K'$ $K^2$ travel in comparatively small arcs, the result being that, as shown in Fig. 10, when the end folds are made the tail end $x$ of the wrapper is thrown to a plane parallel with the folded end and is not left in a plane parallel with the sides. This is accomplished as follows: Instead of pivoting the fittings J K directly in line with the longitudinal axes of the fingers $J'$ $J^2$ $K'$ $K^2$ and close to the pocket containing the article the pivots are dropped down to a considerable distance from the pocket and are offset from said axes, so that when the fingers are tilted they will be carried across the end of the wrapper and fold it properly and yet their ends will be below the periphery of the wheel, so as not to interfere with the side-fold mechanism. Our mechanism therefore constitutes the equivalent of a curved lever from the pivotal point to the end of the finger in contradistinction to a straight lever pivoted in the line of its longitudinal axis. The result is that the end $x$ of the wrapper is folded down, thus leaving a smoother and closer fitting fold than as though the fingers simply made a tuck in the wrapper and left the projecting end $x$ in a plane parallel with the side, thus necessitating a fold through an arc of one hundred and eighty degrees to bring them to the position shown in Fig. 13. The paper has now been folded to the position shown at Fig. 12, and the last step in the revolution of the wheel brings the caramel opposite the discharge-chute.

*Final folding mechanism.*—Extending from the main bed A is a standard M, carrying a table $M'$, Figs. 2 and 4. On this table $M'$ is the discharge-chute $M^2$, made up of metal strips $m$ $m'$ $m^2$, preferably of spring metal, adapted as the discharged wrapped caramels are forced through it to shape the caramels, which may have become more or less distorted in shape while passing through the various operations.

$M^3$ is a suitable bearing resting on the table $M'$, and on this bearing $M^3$, Figs. 1 and 4, are two upright posts or projections $M^4$. On each of these projections is pivoted a bell-crank lever $M^5$ $M^6$. The short arm of each ends in a segment $M^7$, each meshing with the other, as shown in Figs. 1 and 12, so a tilting of the lever $M^5$ will also tilt the lever $M^6$. Connected with the arm $M^8$, which projects from the lever $M^5$, is a rod $M^9$, which extends to and is pivoted to the arm $M^{10}$ on the lever $F^7$, so that a movement of the lever $F^7$, as before explained, will act, through the rod $M^9$, to oscillate the levers M⁵ M⁶. On the end of each lever M⁵ M⁶ are strips M¹¹ M¹², having their ends bent at substantially right angles and toward each other, as shown in Fig. 13. As before explained, the last movement of the wheel E brings the caramel opposite the discharge-chute M². This brings the end of the plunger-rod E⁴ opposite the end of the arm M¹⁰, Figs. 1 and 4. A movement of the lever F⁷ brings this arm M¹⁰ against the plunger-rod E⁴ and causes the plunger to eject the caramel into the chute M², and simultaneously therewith, through the rod M⁹, the levers M⁵ M⁶ are opened, as shown in Fig. 12, to permit the caramel to enter the chute. The lever F⁷ now tilts back and the spring M¹³ brings the levers together, and this causes the strips M¹¹ M¹² to engage the projecting ends of the paper and fold them under, as shown in Fig. 13.

*Intermittent driving mechanism.*—We will now describe the mechanism whereby the wheel E is intermittently revolved.

By reference to Fig. 6 it will be seen that the wheel E is provided with an elongate hub N, which revolves in the bearing *a* of the standard A', the main shaft A⁴ revolving within the sleeve or hub N of the wheel E. Keyed to the end of the hub N by the screw *n* is a ratchet-wheel N'. Engaged to the end of the main shaft A⁴, which, it must be borne in mind, is continuously revolving, is a crank-disk N², and pivoted on the crank-pin *n'* is a rod N³, Fig. 2, the lower end of the latter being pivoted to the lever N⁴, which is in turn pivoted at *n²* to the projecting stud N⁵ on the main plate A. It will thus be seen that as the main shaft A⁴ revolves the lever N⁴ will be oscillated. Carried by the shaft A⁴, but loose thereon, is an arm N⁶, connected with the end of the lever N⁴ by the rod N⁷. Thus an oscillation of the lever N⁴ oscillates the arm N⁶. On the end of the latter is a spring-impelled pawl N⁸, which engages the ratchets on the periphery of the ratchet-wheel N'. Thus through the mechanism just described the ratchet-wheel N', and consequently the wheel E, is given an intermittent or step-by-step movement. In order that the wheel E may not move too far in each step, we provide a brake mechanism. (Shown in detail in Fig. 16.) It consists of a split ring P, adapted to embrace the hub of the ratchet-wheel N', Fig. 6. Between the ring and the hub is a lining of leather or equivalent P'. The two halves of the ring are held together by the screws P², and by them the tension on the lining P', and consequently on the hub, may be regulated. The ring P is prevented from rotating by a pin P³, Fig. 16, which projects from the arm P⁴ on the bearing *a*, Fig. 1.

What we claim is—

1. In a wrapping-machine the combination, with an intermittently-rotatable wrapping-wheel, provided in its periphery with pockets to contain an article to be wrapped and a predetermined amount of wrapper, of a feeding device adapted to deliver said article to said pockets, a wrapper-feeding mechanism located beneath the end of said feeding device and comprising two slotted plates between which the paper is passed, a reciprocating carriage, adjacent to said plates, carrying-rollers which travel in the slots in said plates, a spring or springs actuating oppositely-disposed rollers toward each other, and means to stop rotation in one direction of one or more of said rollers.

2. In a wrapping-machine the combination with an intermittently-rotatable wrapping-wheel, provided in its periphery with pockets to contain an article to be wrapped and a predetermined amount of wrapper, of a feeding device adapted to deliver said article to said pockets, a wrapper-feeding mechanism located beneath the end of said feeding device and comprising two slotted plates between which the wrapper is passed, a reciprocating carriage below the plates, oppositely-disposed rollers carried by the carriage and adapted to reciprocate in the slots of said plates, a ratchet-wheel on the shaft of the lower roller and a pawl on the carriage to engage therewith.

3. In a wrapping-machine the combination with an intermittently-rotatable wrapping-wheel, provided in its periphery with pockets to contain an article to be wrapped and a predetermined amount of wrapper, of a feeding device adapted to deliver said articles to said pockets, a wrapper-feeding mechanism located beneath the end of said feeding device and comprising two slotted plates between which the wrapper is passed, a reciprocating carriage below the plates, oppositely-disposed rollers carried by the carriage and adapted to reciprocate in the slots of the plates, a ratchet-wheel on the shaft of the lower roller and a pawl on the carriage to engage therewith, and a guide-strip substantially vertically disposed above said plates.

4. In a wrapping-machine the combination of a stationary horizontally-disposed feed-table directly supporting the article to be wrapped, a wrapping-wheel disposed adjacent to, and apart from, said table, leaving an intervening open space, said wheel being provided with a pocket for the reception of said article and its wrapper, means for feeding upon said table said article to a point opposite said pocket and said open space, means for feeding said wrapper through said open space to a position between said article and said pocket, a plunger in said pocket, means for positively horizontally advancing said plunger outwardly from said pocket, and transversely of said open space, and for causing said plunger to exert positive pressure against said wrapper and article, a plunger on said table, means for positively horizontally advancing said last-mentioned plunger toward said article to clamp it and said wrapper against said first-mentioned plunger projecting from the pocket and to force said wrapper and article, while so clamped, horizontally across said open space and into said pocket, means to move back the plunger in the pocket synchronously with said advance of said plunger on the table, whereby said article and said wrapper are supported while carried transversely of said open space toward said pocket, and means to retract said plunger on the table after said article and wrapper have been so carried transversely of said open space and into said pocket.

5. In a wrapping-machine the combination of a stationary horizontally-disposed feed-table directly supporting the article to be wrapped, a wrapping-wheel carrying a plunger, means for horizontally reciprocating said plunger when opposite said article so supported by said table, a plunger on said feed-table with means for reciprocating it horizontally, means for feeding upon said table the said article and means for feeding its wrapper in a vertical plane to a point between said article still supported by said table and the wheel-plunger, and a guide-strip arranged in a substantially vertical plane to guide the wrapper.

6. In a wrapping-machine the combination of a wrapping-wheel carrying a plunger, means for reciprocating said plunger when in horizontal position, a plunger on the feed-table provided with means for reciprocating it in a horizontal direction, means for feeding the article to be wrapped to a point between the two plungers, means for feeding a strip of paper in a vertical plane to a point between the article and the wheel-plunger, and a yielding guide-strip arranged in a substantially vertical plane to guide the paper.

7. In a wrapping-machine a stationary discharge-chute, a pair of levers respectively pivoted to a stationary support and provided with intermeshing segments, a final folding-finger carried by each lever and means for oscillating one of said levers whereby the said levers are positively reciprocated in opposite directions in proximity to the orifice of said chute.

8. In a wrapping-carrier the combination with means for holding the article to be wrapped of the following mechanisms: mechanism for introducing said article with its wrapper into the holding means whereby three sides of the article are inclosed; mechanism for successively folding down the wrapper to cover the fourth side; mechanism for tucking down the projecting ends of the wrapper comprising end-folding fingers pivoted to the carrier below the bottom and to the side of the holding means; means for moving said end-folding fingers across the sides and partially across the bottom of the holding means so as to fold the ends of the wrapper in at the sides and down at the bottom into planes substantially parallel with the ends of the article; mechanism for ejecting the article from the holding means and mechanism for giving each end of the wrapper the final fold after it has been ejected from the folding means.

9. In a wrapping-machine, a carrier provided with means for holding a rectangular-sided article and its wrapper, an oscillating end-folding finger mounted on said carrier and having a straight section beveled on its operative edge, and means to operate said finger, whereby said edge at the time of its initial contact with said wrapper is substantially parallel with the proximate edge of the end of said article.

In testimony whereof we sign this specification in presence of two witnesses.

WILLIAM B. PAGE.
ARCHIBALD E. HOPKINS.

Witnesses:
MILTON H. GREEN,
G. B. BRUBAKER.